Figure 4:
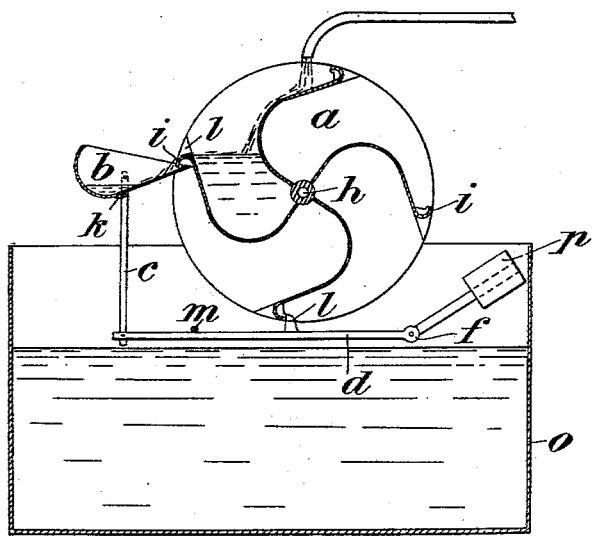

No. 753,001. PATENTED FEB. 23, 1904.
O. C. PIPER.
METER FOR MEASURING WATER OR OTHER LIQUIDS.
APPLICATION FILED JUNE 18, 1903.
NO MODEL. 2 SHEETS—SHEET 1.
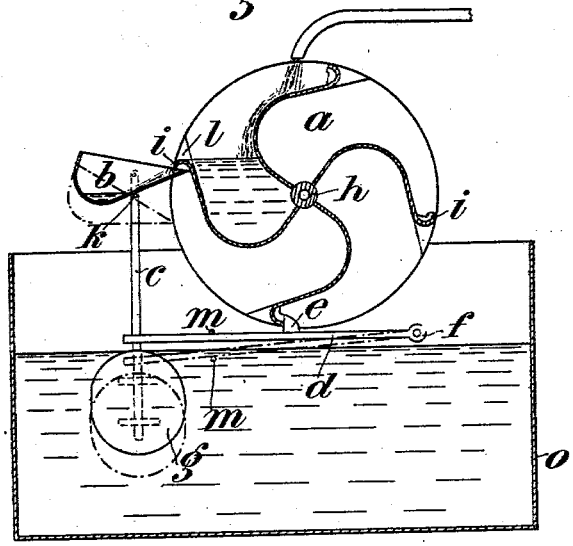
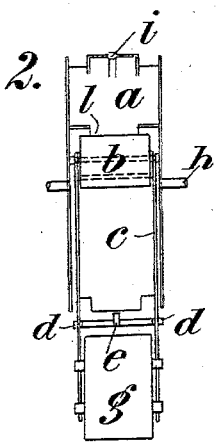 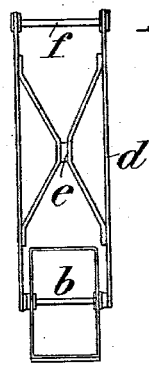
WITNESSES:
W. M. Avery
R. B. Cavanagh
INVENTOR
Oscar Carl Piper
BY
Munn
ATTORNEYS.

No. 753,001. PATENTED FEB. 23, 1904.
O. C. PIPER.
METER FOR MEASURING WATER OR OTHER LIQUIDS.
APPLICATION FILED JUNE 18, 1903.
NO MODEL. 2 SHEETS—SHEET 2.

WITNESSES:
W. M. Avery
C. E. Holste

INVENTOR
Oscar Carl Piper
BY
ATTORNEYS

No. 753,001. Patented February 23, 1904.

UNITED STATES PATENT OFFICE.

OSCAR CARL PIPER, OF HORSENS, DENMARK.

METER FOR MEASURING WATER OR OTHER LIQUIDS.

SPECIFICATION forming part of Letters Patent No. 753,001, dated February 23, 1904.

Application filed June 18, 1903. Serial No. 162,009. (No model.)

*To all whom it may concern:*

Be it known that I, OSCAR CARL PIPER, civil engineer, of Horsens, in the Kingdom of Denmark, have invented certain new and useful Improvements in Meters for Measuring Water or other Liquids, of which the following is a specification.

The existing water-meters built on the turbin and water-wheel principle generally suffer from the drawback that the meter registers differently by different pressures, and consequent different velocity of rotation. Another drawback in connection with these meters is, moreover, that they are easily influenced by dirt and wear, and thereby become inaccurate, the least resistance against the revolving of the meter-wheel making the meter register less.

The object of the present invention is a device by means of which the regulating of the rotation of the meter-wheel can be effected in such a manner as to get fully rid of the aforesaid drawbacks.

The invention is illustrated on the accompanying drawings, in which—

Figure 1 shows my improved apparatus as seen in side elevation, such apparatus being shown in conjunction with a fluid-containing tank. Fig. 2 represents the same seen in front elevation; and Fig. 3 is a top view of the regulating device, the meter-wheel being removed. Fig. 4 is a modification showing the employment of a counterweight in place of a float.

$a$ is the meter-wheel, revolving on the axle $h$. The wheel shown on the drawings has four compartments; but this number may be varied as desired. Each compartment is provided with an overflow-opening $l$, below which is arranged a tooth $i$. The regulating device consists of a tipping bowl $b$, mounted turnably upon bars $c$, which, moreover, carry a float $g$ and are fixed to a frame-lever $d$. The tipping bowl $b$ is oblong and arranged in such a manner that its tipping-axle is parallel with the axle $h$. The one end of the bowl projects into the pockets of the meter-wheel $a$, and when this is turned the bowl is tipped, the teeth $i$ striking against the point of the bowl. The bars $c$ are mutually connected by means of a rod $k$, which acts as an impact for a couple of projections upon the tipping bowl $b$ and which prevents this one from tilting backward. The frame-lever $d$ is mounted turnably on the spindle $f$ and carries, by means of a cross, a catch $e$, capable of engaging the teeth $i$ of the meter-wheel. The catch $e$ on the lever $d$ is arranged in such a manner that when engaged by one of the teeth $i$ it keeps the wheel $a$ firmly in the position shown in Fig. 1, in which one of the overflow-openings is level with the tipping bowl. When the pocket is filled with water, this flows through the overflow-opening into the tipping bowl.

$m$ represents stops limiting the movement of the frame-lever $d$, so that this lever strikes against the uppermost stop $m$ when the tipping bowl $b$ is empty, it being pushed upward by the float $g$. If, however, the tipping bowl is partly filled with water, it will depress the float until the lever $d$ abuts against the lowermost stop $m$. Instead of the float a counterweight can be used, which is then mounted on the extension of the lever $d'$ behind the spindle $f$, this weight being shown at $p$ in Fig. 4.

The working of the apparatus is as follows: The water entering the meter-wheel $a$ after having filled one compartment flows through the overflow $l$ to the tipping bowl $b$, which in its turn depresses the float $g$ until the lever $d$ abuts against the lowermost stop $m$. By the turning of the lever $d$ the tooth $i$ of the meter-wheel has become disengaged from the catch $e$ of the lever $d$, and the wheel will consequently turn, owing to the weight of the filled compartment, until this one is emptied. At the same time as the wheel turns it will, however, tilt the tipping bowl $b$, which when it is emptied will be lifted by the float $g$ and made to assume its former position. The subsequent tooth $i$ of the wheel $a$ will then abut against the catch $e$ of the lever $d$, whereby the wheel $a$ will again be stopped and the next compartment filled, and so on.

A counter can be mounted on the axle $h$ indicating the number of revolutions of the wheel, and thereby the quantity of water consumed may be easily measured.

Having now particularly described and ascertained the nature of this said invention and in what manner the same is to be performed, I declare that what I claim is—

1. The combination of a wheel having compartments therein, a receptacle arranged adjacent to said wheel, a rod upon which said receptacle is pivotally mounted, a lever connected to said rod and extending beneath the wheel, a catch on said lever adapted to be moved into and out of locking engagement with the wheel as the lever is raised or depressed, and stops for limiting the movement of the lever.

2. The combination of a fluid-motor, a locking-bar arranged adjacent to said motor, and a tipping receptacle connected with said bar, designed to contact with and receive fluid from said motor, substantially as set forth.

3. The combination of a wheel having compartments therein, a bar pivoted adjacent to said wheel, a rod connected with said bar, and a receptacle pivoted to said rod and designed to receive fluid from the compartments of the wheel, substantially as set forth.

In testimony that I claim the foregoing as my invention I have signed my name in presence of two subscribing witnesses.

OSCAR CARL PIPER.

Witnesses:
I. HOFMANN BANG,
J. C. JACOBSEN.